Figure 3:
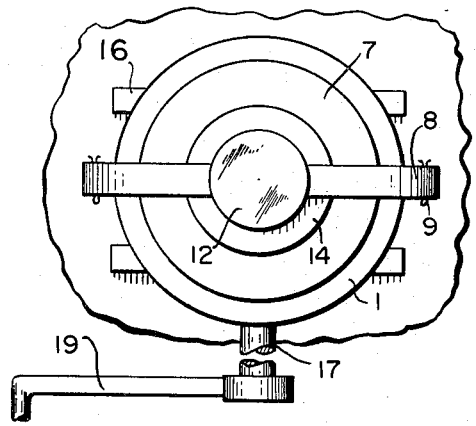

Aug. 18, 1953 A. STABLER 2,649,165
GREASE COMPACTER
Filed March 20, 1952

*INVENTOR.*
Albert Stabler
BY
Adams, Forward and McLean
ATTORNEYS

Patented Aug. 18, 1953

2,649,165

UNITED STATES PATENT OFFICE 2,649,165

GREASE COMPACTER

Albert Stabler, Hammond, Ind., assignor to Sinclair Research Laboratories, Inc., Harvey, Ill., a corporation of Delaware Application March 20, 1952, Serial No. 277,573

2 Claims. (Cl. 183—2.5)

My invention relates to an apparatus which is particularly useful in the preparation of lubricating grease samples when they are to be tested according to the cone penetration method A. S. T. M. test method D-217-48).

One of the most important characteristics of a lubricating grease is its penetration number. However, in the condition in which such greases are normally obtained from the kettle, colloid mill or other equipment in which they are manufactured, such greases normally contain a certain amount of air, which must be removed before a sample of the grease is subjected to the penetration test or otherwise inconsistent and unreliable test results will be obtained. This air is usually removed from the grease sample by vigorous manual shaking of the grease, an operation which is tedious and time-consuming in that it takes about half an hour. Even then, the test results obtained upon the sample may not be reliable because of the difficulty of removing all of the air from the grease sample by manual shaking.

In accordance with my invention I have devised a grease compacter which is useful in the removal of air from grease in order that a sample of the grease will be suitable for testing according to the penetration method. The use of my device makes possible the removal of the air from the grease in a matter of a relatively few seconds, with very little manual effort being required of the person who is preparing the grease sample for the test, and with the preparation of a grease sample which is substantially free of air and which therefore gives highly consistent results in the penetration test.

These desirable results are obtained in my apparatus by the use of a quick-drop cam which allows a spring-loaded grease working cup, containing the sample, to be accelerated at a rapid rate until it comes into contact with a solid base plate. This rapid acceleration tends to release air pockets which are present in the sample, while the sudden de-acceleration and resulting jar, caused by the striking of the base plate by the sample cup, uniformly compacts the grease.

The apparatus of my invention comprises a vertically positioned slide mount which has a stop at its lower end. A plunger is slidably mounted within the slide mount with its lower extremity extending below the slide mount and with its upper face adapted to receive the lower end of the grease working cup. A cup retainer is slidably mounted within the slide mount at a position above the plunger and is tapped to receive and retain the upper threaded end of the grease working cup. A horizontal, rotatable shaft, having a cam mounted thereon, is positioned below the slide mount. This cam is positioned so as to engage the lower extremity of the plunger and is so shaped that rotation of the cam slowly raises the plunger and then permits the plunger to drop rapidly under the impetus of a spring which is compressed by the upward movement of the plunger. The downward movement of the plunger is arrested when the plunger contacts a stop which is fixed to the slide mount. The spring is desirably a coil spring having its upper end fixed to the top of the slide mount and its lower end bearing downwardly against the cup retainer, the dimensions of the spring being such that even in the downward position of the plunger there is some compression of the spring.

Figure 4:
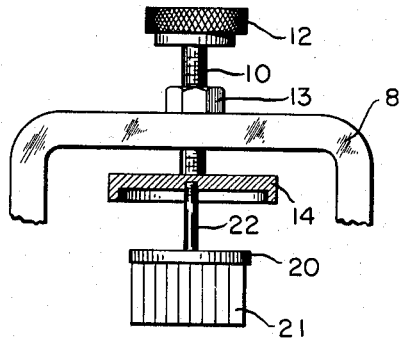
Figure 1:
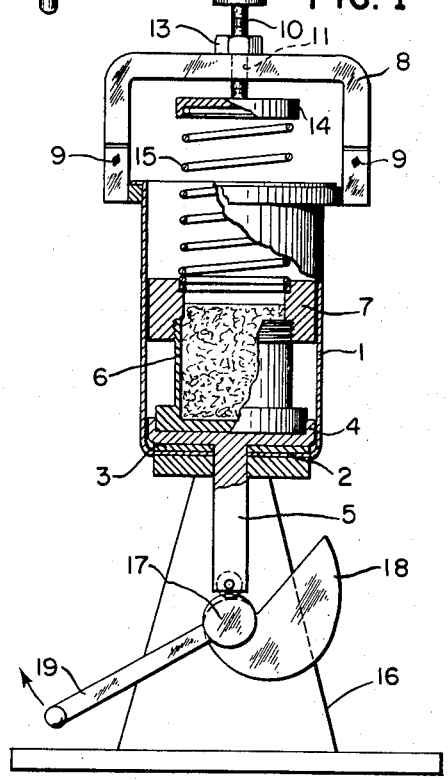
Figure 2:
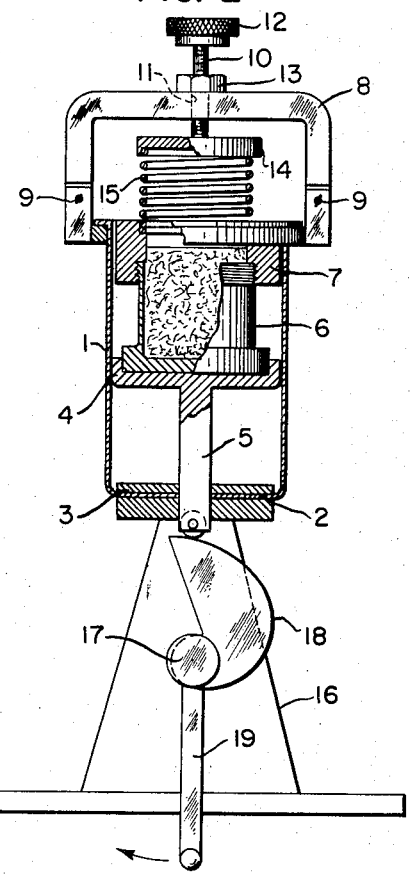
Figure 5:
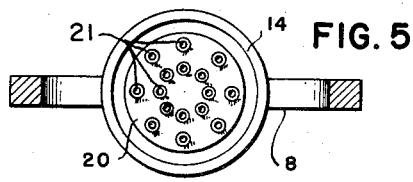

Referring to the drawing for further details concerning the device which I have invented, Fig. 1 and Fig. 2 are elevations which show a grease compacter falling within the scope of my invention. These two figures show approximately the positions of the parts at the two extremities which occur during the operation of my apparatus, and are partially sectioned in order to show more clearly the inner arrangement and positions of the parts. Fig. 3 is a plan view of the grease compacter of Fig. 1 and Fig. 2, while Fig. 4 and Fig. 5 are, respectively, an elevation and a cross-section of a special deaerating device which is advantageously used in connection with my grease compacter when the grease sample being prepared for test has a large number of air pockets.

In the drawing, the reference numeral 1 designates the slide mount which in the illustrated case is a vertically positioned cylinder having an annular bottom 2. This mount is suitably a stainless steel beaker. A leather ring 3 is positioned on the bottom 2 of the cylindrical slide mount 1. Plunger 4 is a piston mounted within cylinder 1, and is free to slide upwardly and downwardly therein. Rod 5 is fixed to the lower side of piston 4 and extends downwardly through the centers of ring 3 and bottom 2.

The upper surface of piston 4 is recessed to receive grease working cup 6, which suitably is the standard working cup used for preparing worked samples according to test D-217-48, but which may also be a simple cylinder with a closed bottom or other cup-shaped container. Annular cup retainer 7 is mounted within the slide mount 1, so that the retainer is free to slide upwardly and downwardly. The lower portion of the inner surface of the retainer is suitably threaded, so that it may be attached to the corresponding, upper threaded surface of the grease working cup.

Mounting arm 8 is a yoke and is fixed to the upper edge of slide mount 1 by means of removable pin connections 9, suitably cotter pins. Mounting arm 8 is provided with a tapped opening 11 at its center, this opening being positioned coaxially with respect to slide mount 1. Mounting screw 10, provided with suitable threads, and with knurled knob 12 at its upper end, is inserted into opening 11. Nut 13 is used to fix the position of screw 10 with respect to mounting arm 8. Screw 10 at its lower end is fixed to spring retainer 14, which is a flat disc turned downwardly at its outer edges to retain the upper end of coil spring 15. The lower end of coil spring 15 is received by the upper side of annular cup retainer 7, which is also suitably recessed for this purpose.

Cylindrical slide mount 1 is fixed to standard 16, which holds it above the surface of the table, bench or other place where my device is to be used. Rotatable shaft 17 is mounted in a horizontal position on standard 16 below slide mount 1. Cam 18 is affixed to rotatable shaft 17 so that its profile surface engages rod 5. Suitably, the lower end of the rod is provided with a bearing surface or with a small wheel which rides on the engaging surface of cam 18. Cam 18 is of slow-rise, quick-drop configuration, such as that illustrated, and crank 19 is provided to rotate shaft 17 and, as a result cam 18.

In the operation of the apparatus of my invention, grease working cup 6 is first filled with grease to a level about ¼-inch above the top of the cup, as illustrated in Fig. 1 and Fig. 2. The cup retainer 7 is screwed on top of the grease working cup and the cup retainer 7 and cup 6 are then fitted inside slide mount 1 so that the lower end of cup 6 rests on the upper surface of piston 4. Coil spring 15 is then placed on top of annular cup retainer 7, and mounting arm 8, which supports spring retainer 14, is placed in position over coil spring 15 and fixed to slide mount 1 by pin connections 9.

After the device has been in use, it is generally unnecessary to readjust the compression on coil spring 15 and, in fact, it is highly desirable that the same compression be used from test to test. However, initial adjustment of the compression is made by loosening nut 13 and adjusting knurled knob 10 until the proper compression is placed on spring 15. This must be done, of course, when the grease working cup is in position and piston 4 is resting on leather ring 3. When the proper compression is placed on spring 15, nut 13 is then tightened to lock the position of screw 10 and hence retainer 14.

When the apparatus is loaded with grease, crank 19 is rotated at a relatively slow rate, for example one revolution per second, in a direction causing rod 5 to follow the profile of cam 18. This will force piston 4 upwardly and thereby place spring 15 under compression, which is suddenly released at the quick-drop portion of the cam. This sudden release causes rapid downward movement of cup 6, which movement is brought to a sudden stop when piston 4 contacts leather ring 3. The rapid downward acceleration caused by the spring releases the air bubbles and pockets contained in the grease, while the sudden stop tends to pack the grease uniformly in the grease working cup. Generally, ten or twelve revolutions of crank 19 results in the preparation of a grease sample which is suitable for the penetration test.

Certain grease samples contain an unusual number of air pockets. The time required to prepare a sample of such greases can be diminished by using the aerator attachment illustrated in Fig. 4 and Fig. 5 of the drawing. This attachment is a small disc 20 having a small diameter of hollow tubes 21 depending from its lower surface at spaced intervals. The attachment is fixed to spring retainer 14 by means of a threaded rod 22 extending from the center of the upper surface of the attachment. In the operation of my device, the deaerator attachment remains in fixed position within coil spring 15. The upward movement of cup 6 due to the rotation of crank 19 forces tubes 21 to penetrate deeply into the grease, and the sudden downward movement of cup 6 as plunger 5 passes the quick-drop portion of the profile of cam 18 apparently produces a partial vacuum in the holes formed in the grease by tubes 21, thus resulting in the quick release of air pockets in the grease. When the grease working cup is at its highest point, the bottoms of the tubes of the attachment are approximately one-eighth inch above the top of the grease working cup and penetrate about one-eighth inch into the excess grease. The extent of the penetration can be adjusted by means of knob 12.

I claim:

1. A grease compacter useful in preparing uniform samples of grease for penetration testing which comprises a vertically positioned slide mount having a stop at its lower end, a plunger slidably mounted within said slide mount, a cam having a slow-rise, quick-drop profile operatively engaging said plunger, a cup retainer slidably mounted within said slide mount above said plunger, said plunger being adapted to receive a grease containing cup on its upper surface and said cup retainer being adapted to engage the upper end of said grease containing cup, a spring retainer fixed to said slide mount above said cup retainer, and a compression spring between said spring retainer and cup retainer, said spring being placed under compression against said cup retainer by said spring retainer when said grease containing cup is mounted upon said plunger and engaged with said cup retainer.

2. A grease compacter useful in preparing uniform samples of grease for penetration testing which comprises a vertically positioned slide mount having a stop at its lower end, a plunger slidably mounted within said slide mount, a cam having a slow-rise, quick-drop profile operatively engaging said plunger, a cup retainer slidably mounted within said slide mount above said plunger, said plunger being adapted to receive a grease containing cup on its upper surface and said cup retainer being adapted to engage the upper end of said grease containing cup, a spring retainer fixed to said slide mount above said cup retainer, a compression spring between said spring retainer and cup retainer, said spring being placed under compression against said cup retainer by said spring retainer when said grease containing cup is mounted upon said plunger and engaged with said cup retainer, and a disc from which depend a plurality of hollow tubes, said disc being positioned within said spring and also positioned in such manner that the bottoms of said tubes are slightly above the top of said cup when said plunger is in its highest position.

ALBERT STABLER.

References Cited in the file of this patent

UNITED STATES PATENTS

| Number | Name | Date |
| --- | --- | --- |
| 991,381 | Simmers | May 2, 1911 |
| 1,412,774 | Collamer | Apr. 11, 1922 |
| 1,908,104 | Bell | May 9, 1933 |
| 2,235,942 | Moore | Mar. 25, 1941 |

FOREIGN PATENTS

| Number | Country | Date |
| --- | --- | --- |
| 119,450 | Germany | Apr. 11, 1901 |